United States Patent [19]

Inaba

[11] Patent Number: 4,864,495
[45] Date of Patent: Sep. 5, 1989

[54] APPARATUS FOR CONTROLLING VACANT AREAS IN BUFFER MEMORY IN A POCKET TRANSMISSION SYSTEM

[75] Inventor: Akira Inaba, Tokyo, Japan

[73] Assignee: Kabushiki Kaisha Toshiba, Kawasaki, Japan

[21] Appl. No.: 79,163

[22] Filed: Jul. 29, 1987

[30] Foreign Application Priority Data

Jul. 30, 1986 [JP] Japan ................. 61-179122

[51] Int. Cl.[4] ............... G06F 15/00; G06F 12/02
[52] U.S. Cl. ......................... 364/200; 364/222.2; 364/239.6; 364/244.3; 364/260.1; 364/284.1; 370/94.1
[58] Field of Search ............ 364/200, 900; 370/60, 370/94, 61

[56] References Cited

U.S. PATENT DOCUMENTS

| | | | |
|---|---|---|---|
| 4,121,286 | 10/1978 | Venton et al. | 364/200 |
| 4,491,909 | 1/1985 | Shimiger | 364/200 |
| 4,530,049 | 7/1985 | Zee | 364/200 |
| 4,569,034 | 2/1986 | Findley et al. | 364/900 |
| 4,607,363 | 8/1986 | Platel et al. | 370/94 |
| 4,674,033 | 6/1987 | Miller | 364/200 |
| 4,748,618 | 5/1988 | Brown et al. | 370/94 |
| 4,758,944 | 7/1988 | Bartley et al. | 364/200 |

*Primary Examiner*—Archie E. Williams, Jr.
*Assistant Examiner*—Thomas C. Lee
*Attorney, Agent, or Firm*—Oblon, Spivak, McClelland, Maier & Neustadt, P.C.

[57] ABSTRACT

A packet-switching system having a buffer memory for storing received packets. The system has a FIFO-type table for storing data items each consisting of the start and end addresses of every region of the buffer memory from which data has been read out and transferred to a receiving station and which has thus become vacant. The start and end addresses of each region of the buffer memory are controlled, thereby achieving a high-speed control of the buffer memory.

10 Claims, 3 Drawing Sheets

APPARATUS FOR CONTROLLING VACANT AREAS IN BUFFER MEMORY IN A POCKET TRANSMISSION SYSTEM

BACKGROUND OF THE INVENTION

The present invention relates to a packet-switching system having a buffer memory for storing received packets, and more particularly, to a packet-switching system which can perform a high-speed, one-dimensional control of the buffer memory.

Recently, the data communication method, generally called "packet switching", has been put to practical use in various places. In this method, the data to be transmitted is divided into data blocks of a predetermined length. The destination address and control data are attached to each of these data blocks, thus forming a packet. The data is transmitted or exchanged, packet by packet. The data transmitted from a transmitting station is temporarily stored in the buffer memory provided in a packet-switching system. The data is processed in accordance with the destination address and the control data, and is then transmitted to a receiving station, also packet by packet.

Hitherto, the buffer memory used in the packet-switching system has been controlled in the following way. The storage area of the memory is divided into a plurality of regions of the same size. Of these regions, those storing no data are detected. A list of the start addresses of the vacant regions is prepared. This list is referred to, thereby identifying the vacant regions of the buffer memory, and the received data is stored into those vacant regions. As soon as data is read out from any region and subsequently transferred to the receiving station, this region is regarded as vacant, and its start address is added to the list.

This method of controlling the buffer memory, which is accomplished with reference to the list of the start addresses of vacant regios, can indeed help to enhance the use efficiency of the buffer memory, provided the size of the regions is sufficiently small. However, it takes rather a long time to identify the vacant regions by referring to the list. Today, the data-transfer speed has increased very much, and the buffer memory of the packet-switching system should now be controlled at a higher speed.

SUMMARY OF THE INVENTION

It is accordingly the object of the present invention to provide a packet-switching system which can control a buffer memory at high speed, by using a FIFOtype table of data items each consisting of the start and end addresses of a region of the buffer memory that has become vacant upon the transfer of data from it to a receiving station, and by referring to the FIFO-type table thereby to identify the start address of the region which has been occupied longer than any other regions of the buffer memory.

According to the invention, there is provided a packet-switching system which comprises:

buffer memory circuitry for temporarily storing data packets and supplying the data packets;

address memory circuitry for storing an oldest address of said buffer memory circuitry at which an oldest data packet is stored;

control table circuitry of FIFO type for storing and end addresses of any vacant region of said buffer memory circuitry from which data has been read out and which has become vacant;

output-pointing circuitry for specifying a memory location of said control table circuitry at which start and end addresses of a region of said buffer memory circuitry which has been vacant longer than any other regions is stored;

input-pointing circuitry for specifying a memory location of said control table circuitry at which start and end addresses of the latest vacant region of said buffer memory circuitry that has newly become vacant are to be stored; and processing circuitry coupled to said address circuitry, said buffer circuitry, said control table circuitry, said input and output pointing circuitry for controlling the vacant region of said buffer memory circuitry in accordance with the oldest address stored in said address memory circuitry, the start and end address of the latest vacant region of said buffer memory from which data has been read out, and the start and end addresses of any vacant region stored in said control table circuitry, wherein said processing circuitry updates the oldest address stored in said address memory circuitry to an address, of said buffer memory which has not been read out yet, next to the end address of the latest vacant region of said buffer memory circuitry from which data has been read out and which has become vacant, when the latest vacant region is continuous to said oldest address, and rewrites the address stored in said control table circuitry when the latest vacant region which has newly become vacant is continuous to any other vacant region stored in said control table circuitry, in order to combine these continuous regions into one vacant region.

BRIEF DESCRIPTION OF THE DRAWINGS

The other objects and features of the present invention will be apparent from the following description taken in connection with the accompanying drawings, in which.

DETAILED DESCRIPTION OF THE PREFERRED EMBODIMENT

Figure 1:
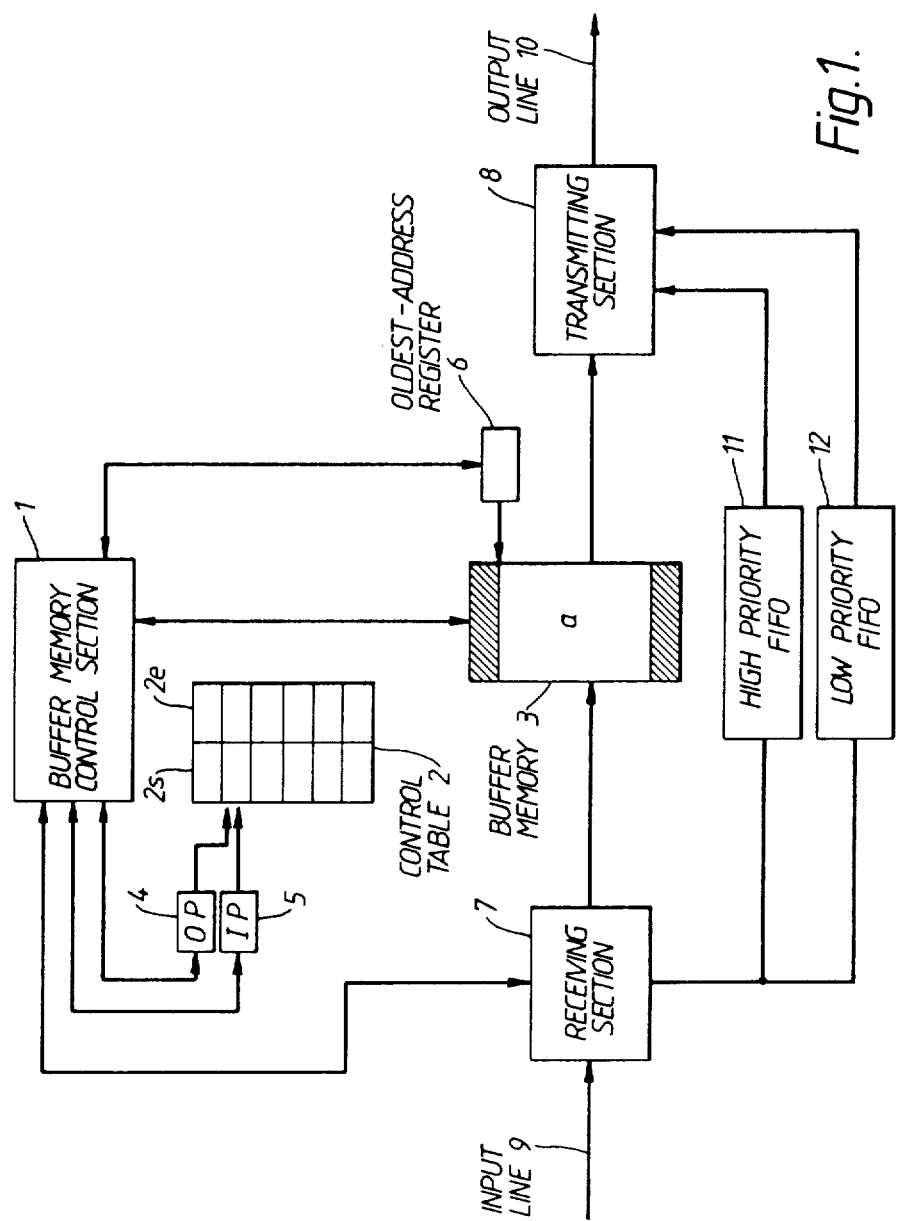
FIG. 1 is a block diagram showing and packet-switching system according to the present invention.

One embodiment of the invention will now be described with reference to the accompanying drawings. FIG. 1 is a block diagram showing a packet-switching system according to the invention. Each packet sent from a transmitting station is supplied to receiving section 7 via input line 9. The packet consists of data, priority data at either a high level or a low level, and ID data identifying the packet and thus distinguishing it from any other packets. Receiving section 7 decodes the priority data. When the priority data is at the high level, the ID data is supplied to high- priority FIFO memory 11. When the priority data is at the low level, the ID data is supplied to low-priority FIFO memory 12. Either FIFO memory is designed to store the ID data. Receiving section 7 sends the data contained in the packet, to buffer memory 3. Under the control of buffer memory control section 1, transmitting section 8 reads the ID data items of packets, one after another, from high-priority FIFO memory 11. The high-priority packets identified by these ID data items are read from buffer memory 3 and are then transferred via output line 10. When all packets of high priority are transferred through output line 10, transmitting section 8 reads the ID data items of packets, one after another, from low-priority FIFO memory 12. The low-priority packets identified by these ID data items are read from buffer memory 3 and then transferred through output line 10.

Figure 7:
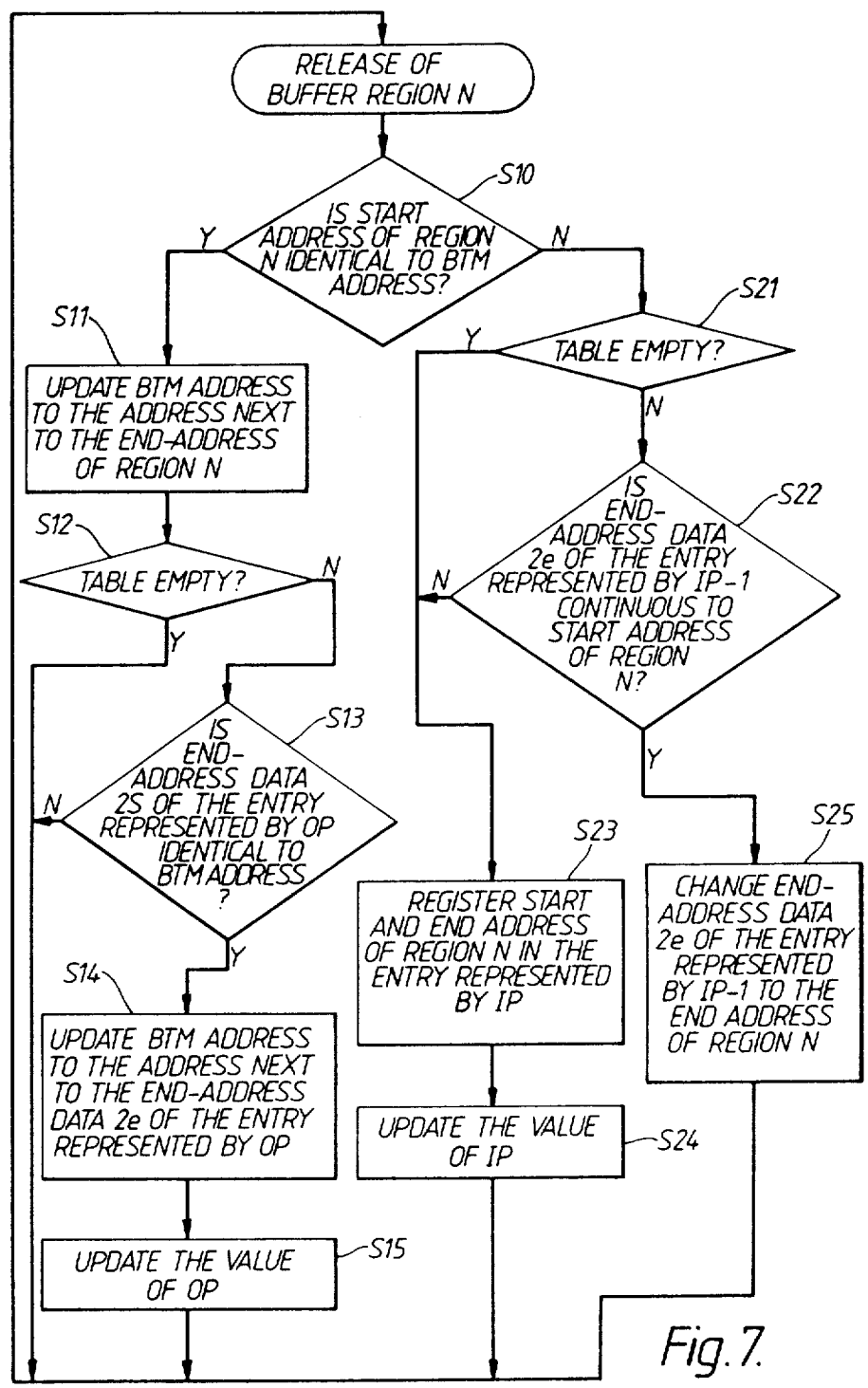
FIG. 7 is a flow chart illustrating how the packet-switching system of the invention controls buffer memory 3.

Buffer memory control section 1 controls the releasing of buffer memory 3 as is explained in the flow chart of FIG. 7. The "releasing" of buffer memory 3 is a process of rendering a region of memory 3 vacant after the data has been read out from this region and subsequently sent to a receiving station, so that new data can be stored in the region. Control table 2 is a FIFO type memory, and is designed to store address data for controlling the regions of buffer memory 3, under the control of buffer memory control section 1. As is shown in FIG. 1, control table 2 comprises start-address storing section 2s and end-address storing section 2e. Under the control of buffer memory control section 1, buffer memory 3 stores the data to be transferred. The shaded portion of buffer memory 3 shows region which has been released or vacant region. The region a of buffer memory 3 shows region of buffer memory 3 stores the data. Buffer memory control section 1 releases that region of buffer memory 3 from which data has been read out and sent to the receiving station. Oldest-address register 6 stores the oldest address (BTM), or the start address of the region of memory 3, which has been storing data longer than any other regions. Output pointer (OP) 4 represents the oldest entry to control table 2. Input pointer (IP) 5 represents the newest entry to control table 2, i.e., the address of that region of buffer memory 3 in which next data will be stored.

FIGS. 2 to 6 are diagrams showing the conditions which control table 2, OP 4, and IP 5 take when data is transferred from one region of buffer memory 3 to a receiving station. FIG. 7 is a flow chart illustrating the operation of buffer memory control section 1.

Any region of buffer memory 3 that becomes vacant does not exist between the region which has been occupied longer than any other regions, and the region which has become vacant already, provided that its start address is not identical with the oldest address stored in oldest-address register 6.

The operation of this embodiment will now be explained with reference to FIG. 7. In order to transfer data stored in region N of buffer memory 3 to a receiving station, buffer memory control section 1 determines whether or not the start address of region N is identical to the oldest address stored in register 6 (Step 10). If YES, the oldest address is updated to the address next to the end address of region N (step 11). Then, the value of OP 4 is compared with the value of IP 5, thereby determining whether control table is empty or not (Step 12). More specifically, when the value of OP4 and that of IP 5 are identical, it is determined that control table 2 is empty. If table 2 is found to be empty, the updating of the oldest address is topped. If table is found not to be empty, it is determined whether or not the start address stored in start-address storing section 2s is identical to the oldest address stored in oldest-address register 4 (Step 13). If NO in Step 13, the updating the oldest address for region N is stopped. If YES in Step 13, the oldest address is updated to the address next to the end address represented by OP 4 and stored in end-address storing section 2e of control table 2 (Step 14). Then, one is added to the value of OP 4, thereby completing the updating of the oldest addresses for region N (Step 15).

If it is determined in Step 10 that the start address of region N storing the data to be transferred is not identical to the oldest address, the value of OP 4 is compared with the value of IP 5, thereby determining whether control table 2 is empty or not (Step 21). If YES in Step 21, the start address and end address of region N are registered in the start-address storing section 2s and end-address storing section 2e of control table 2, respectively (Step 23). Then, one is added to the value of IP 5, thus ending the updating of the oldest address for region N (Step 24). If NO in Step 21, it is determined whether or not the end address stored immediately before the input location designated by IP 5 is continuous to the start address of region N (Step 22). In other words, in Step 22, it is determined whether or not the address next to said end address is identical to the start address of region N. If NO in Step 22, the operation goes to Step 23. If YES in Step 22, said end address is updated to the end address of region N (Step 25), thereby completing the updating of the oldest address for region N.

Figure 2:
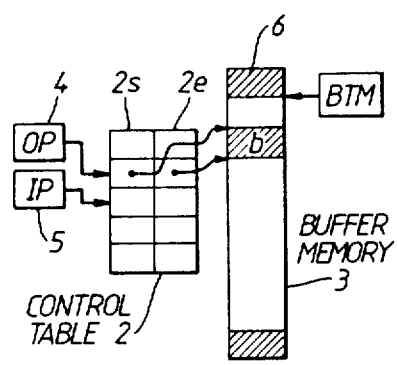
FIGS. 2 and 3 are diagrams showing the conditions which control table 2, output pointer (OP) 4, input pointer (IP) 5 and oldest-address register 6 take when the data is transferred to a receiving station from specified region b of buffer memory 3 shown in FIG. 1.
Figure 3:
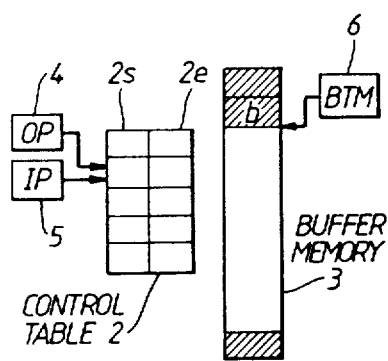

With reference to FIGS. 2 to 6, it will be explained how the conditions of control table 1, OP 4, IP 5 and oldest-address register 6 change as buffer memory control section 1 operates. FIGS. 2 and 3 are diagrams showing the conditions which control table 2, OP 4, IP 5, and register 5 take when data is transferred from specific region b of buffer memory 3 shown in FIG. 1 to a receiving station. More precisely, FIG. 2 shows the case where the start address of region b is not identical to the address stored in oldest-address register 6, and FIG. 3 illustrates the case where the start address of region b is identical to the address stored in oldest-address register 6. When the start address of region b is not identical to the address stored in oldest-address register 6, steps 21 to 25 (FIG. 7) are executed. In this case, the start address of region b is stored in start-address storing section 2s, and the end address of region b is stored in end-address storing section 2e (Step 23). Then, one is added to the value of IP 5 (Step 24). On the other hand, when the start address of region b is identical to the address stored in oldest- address register 6, Steps 11 to 15 (FIG. 7) are executed. In this case, the address stored in oldest- address register 6 is updated to the address next to the end address of region b (Step 11).

Figure 4:
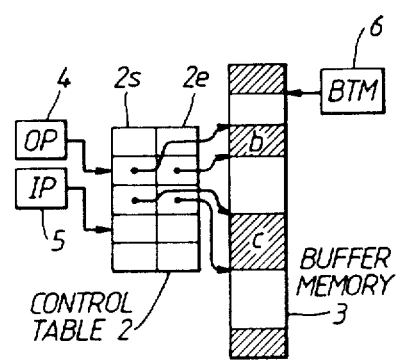
FIGS. 4 and 5 are diagrams showing the conditions which control table 2, output pointer (OP) 4, input pointer (IP) 5 and oldest-address register 6 take when the data is transferred to a receiving station from specified region c of buffer memory 3 shown in FIG. 2.
Figure 5:
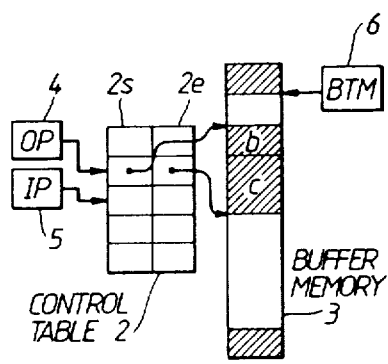

FIGS. 4 and 5 are diagrams showing the conditions which control table 2, OP 4, IP 5, and register 6 take when data is transferred from specific region c of buffer memory 3 shown in FIG. 2 to the receiving station. More precisely, FIG. 4 illustrates the case where the start address of region c which will be released next is not identical to the address stored in oldest-address register 6 (Step 11), and is not continuous to region b which has been released (Step 22). In this case, the start address and end address of region c are written in start-address storing section 2s and end-address storing section 2e of control table 2, which are designated by IP 5 (Step 23). Then, one is added to the value of IP 5 (Step 24). FIG. 5 illustrates the case where the start address of region c which will be released next is not identical to the address stored in oldest-address register 6 (Step 11), and is continuous to region b which has been released (Step 22). In this case, the address, which has been registered in section 2i e concurrently with the release of region b, is updated to the value of the end address of region c which will be released (Step 25). In other words, region b already released, and region c to be released, are regarded as a single, released region, and are registered again in control table 2.

Figure 6:
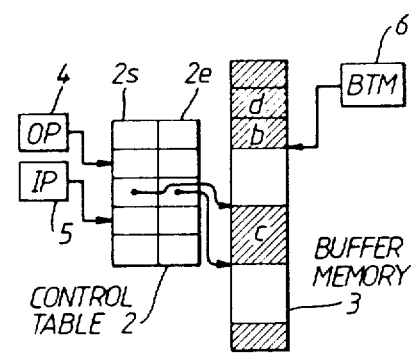
FIG. 6 is a diagram explaining how control table 2, output pointer (OP) 4, input pointer (IP) 5 and oldest-address register 6 operate when the data is transferred to a receiving station from specified region d of buffer memory 3 shown in FIG. 4.

FIG. 6 shows the the conditions which control table 2, OP 4, IP 5, and register 6 take when data is transferred from specific region d of buffer memory 3 shown in FIG. 4 to a receiving station. In the case shown in FIG. 6, the start address of region d, which will be released next, is identical with the address stored in oldest-address register 6 (Step 10), and the end address of this region d is identical with the start address of any region already released, which is stored in end-address storing section 2e designated by OP 4 (Step 13). In this case, the address stored in oldest-address register 6 is first updated to the address next to the end address of newly released region d (Step 11), and then updated to the address next to the end address of region b already released and registered in control table 2. That is, the address stored in oldest-address register 6 is updated to the address next to the end address stored in end- address section 2e designated by OP 4 (Step 14). After the updating of the oldest address, one is added to the value of OP 4 (Step 14), thus completing the updating of the oldest address for region d.

Any other region of buffer memory 3 is released in the same way described above.

As has been described above, in the embodiment of the present invention, any region of buffer memory 3, from which data is read out and transferred to a receiving section, need not be compared with the other regions of buffer memory 3 which have been released, in order to determine whether or not the region is continuous to one of the released regions. If suffices to compare the addresses of the region with those of the released region which are stored in control table 2 and designated by OP 4. Hence, the address of the region which has been occupied longer than any other regions of buffer memory 3 can be updated at high speed.

What is claimed is:

1. A processing system which receives data packets from a station and sends the data packets to another station, said system comprising:

buffer memory means for temporarily storing data packets and supplying the data packets;

address memory means for storing an oldest address of said buffer memory means at which an oldest data packets is stored;

control table means of FIFO type for storing start and end addresses of any vacant region of said buffer memory means from which data has been read out and which has become vacant;

output-pointing means for specifying a memory location of said control table means at which start and end addresses of a region of said buffer memory means which has been vacant longer than any other regions is stored;

input-pointing means for specifying a memory location of said control table means at which start and end addresses of the latest vacant region of said buffer memory means that has newly become vacant are to be stored; and processing means coupled to said address memory means, said buffer memory means, said control table means, said input and output pointing means, for controlling the vacant region of said buffer memory means in accordance with the oldest address stored in said address memory means, the start and end addresses of the latest vacant region of said buffer memory from which data has been read out, and the start and end addresses of any vacant region stored in said control table means, wherein said processing means updates the oldest address stored in said address memory means to an address, of said buffer memory which has not been read out yet, next to the end address of the latest vacant region of said buffer memory means from which data has been read out and which has become vacant, when the latest region is continuous to said oldest address, and rewrites the address stored in said control table means when the latest vacant region which has newly become vacant is continuous to any other vacant region stored in said control table means, in order to combine these continuous vacant regions into one vacant region.

2. The processing system as claimed in claim 1, wherein said processing means compares the oldest address stored in said address memory means with the start address of the latest vacant region of said buffer memory means from which data has been newly read out, and updates the oldest address to the address, of said buffer memory which has not been read out yet, next to the end address of the latest vacant region of said buffer memory means from which data has been newly read out when the oldest address is found to be identical to the start address of the latest vacant region.

3. The processing system as claimed in claim 1, wherein said processing means compares the oldest address stored in said address memory means with the start address of the latest vacant region of said buffer memory means from which data has been newly read out, updates the oldest address to the address, of said buffer memory which has not been read to yet, next to the end address of the latest vacant region of said buffer memory means from which data has been newly read out when the oldest address is found to be identical to the start address of the latest vacant region, compares the start address stored in the memory location designated by said output-pointing means with the updated oldest address, and re-updates the updated oldest address to the address, of said buffer memory which has not been read out yet, next to the end address stored in the memory location designated by said output-pointing means, when the start address stored in the memory location designated by said output-pointing means is found to be identical to the updated oldest address.

4. The processing system as claimed in claim 1, wherein said processing means compares the oldest address stored in said address memory means with the start address of the latest vacant region of said buffer memory means from which data has been newly read out,
- updates the oldest address to the address, of said buffer memory which has not been read out yet, next to the end address of the latest vacant region of said buffer memory means from which data has been newly read out when the oldest address is found to be identical to the start address of the latest vacant region,
- compares the memory location designated by said output-pointing means with the memory location designated by said input-pointing means to determine whether or not said control table means is empty,
- compares the start address stored in the memory location designated by said output-pointing means with the updated oldest address, when the memory location designated by said output-pointing means is found to be not identical to the memory location designated by said input-pointing means,
- re-updates the updated oldest address to the address, of said buffer memory which has not been read out yet, next to the end address stored in the memory location designated by said output-pointing means, when the start address stored in the memory location designated by said output-pointing means is found to be identical to the updated oldest address, and
- updates the memory location designated by said output-pointing means by adding one to the value designated by said output-pointing means.

5. The processing system as claimed in claim 1, wherein said processing means compares the oldest address stored in said address memory means with the start address of the latest vacant region of said buffer memory means from which data has been newly read out,
- updates the oldest address to the address, of said buffer memory which has not been read out yet, next to the end address of the latest vacant region of said buffer memory means from which data has been newly read out when the oldest address is found to be identical to the start address of said latest vacant region,
- compares the memory location designated by said output-pointing means with the memory location designated by said input-pointing means to determine whether or not said control table means is empty,
- compares the start address stored in the memory location designated by said output-pointing means with the updated oldest address, when the memory location designated by said output-pointing means is found to be not identical to the memory location designated by said input-pointing means,
- re-updates the updated oldest address to the address, of said buffer memory which has not been read out yet, next to the end address stored in the memory location designated by said output-pointing means, when the start address stored in the memory location designated by said output-pointing means is found to be identical to the updated oldest address,
- updates the memory location designated by said output-pointing means by adding one to the value designated by said output-pointing means, and
- completes the updating of the oldest address for the latest vacant region from which data has been newly read out, after the memory location designated by said output-pointing means has been updated, or if the memory location designated by said output-pointing means has been found to be identical to the memory location designated by said input-pointing means, or if the start address stored at the memory location designated by said output-pointing means is found to not be identical to the updated oldest address.

6. The processing system as claimed in claim 1, wherein said processing means compares the oldest address stored in said address memory means with the start address of the latest vacant region of said buffer memory means from which data has been newly read out,
- compares the start address of the latest vacant region of said buffer memory means from which data has been newly read out with an end address of the vacant region which is stored in a memory location immediately preceding the memory location designated by said input-pointing means, when the oldest address is found to be not identical to the start address of the latest vacant region, and
- updates the end address of the vacant region which is stored in the memory location immediately preceding the memory location designated by said input-pointing means to the end address of the latest vacant region of said buffer memory means from which data has been newly read out, when the start address of said latest vacant region is found to be identical to the end address of the vacant region which is stored in the memory location immediately preceding the memory location designated by said input-pointing means.

7. The processing system as claimed in claim 1, wherein said processing means compares the oldest address stored in said address memory means with the start address of the latest vacant region of said buffer memory means from which data has been newly read out,
- compares the start address of the latest vacant region of said buffer memory means from which data has been newly read out with an end address of the vacant region which is stored in a memory location immediately preceding the memory location designated by said inputpointing means, when the oldest address is found to be not identical to the start address of said latest vacant region, and
- registers the start and end addresses of the latest vacant region at the memory location designated by said input-pointing means, when the start address of the latest vacant region is found to be not identical to the end address of the vacant region which is stored in the memory location immediately preceding the memory location designated by said input-pointing means.

8. The processing system as claimed in claim 1, wherein said processing means compares the oldest address stored in said address memory means with the start address of the latest vacant region of said buffer memory means from which data has been newly read out,
- compares the memory location designated by said output-pointing means with the memory location designated by said input-pointing means to determine whether said control table means is empty or not, when the oldest address is found to be not identical to the start address of the latest vacant region, compares the start address of the latest vacant region of said buffer memory means from which data has been newly read out with an end address of the vacant region which is stored in a memory location immediately preceding the memory location designated by said inputpointing means, when the memory location designated by said input-pointing means is found to be not identical to the memory location designated by said outputpointing means, registers the start and end addresses of the latest vacant region at the memory location designated by said input-pointing means, when the memory location designated by said input-pointing means is found to be identical to the memory location designated by said output-pointing means, or when the start address of the latest vacant region is found to be not identical to the end address of the vacant region which is stored in the memory location immediately preceding the memory location designated by said input-pointing means, and, updates the memory location designated by said input-pointing means by adding one to the value designated by said input-pointing means.

9. The processing system as claimed in claim 1, wherein said processing means compares the oldest address stored in said address memory means with the start address of the latest vacant region of said buffer memory means from which data has been newly read out, compares the memory location designated by said output-pointing means with the memory location designated by said input-pointing means to determine whether said control table means is empty or not, when the oldest address is found to be not identical to the start address of the latest vacant region, compares the start address of the latest vacant region of said buffer memory means from which data has been newly read out with an end address of the vacant region which is stored in a memory location immediately preceding the memory location designated by said input pointing means, when the memory location designated by said input-pointing means is found to be not identical to the memory location designated by said outputpointing means, registers the start and end addresses of the latest vacant region at the memory location designated by input-pointing means, when the memory location designated by said output-pointing means is found to be identical to the memory location designated by said input-pointing means, or when the start address of the latest vacant region is found to be not identical to the end address of the vacant region which is stored in the memory location immediately preceding the memory location designated by said input-pointing means, updates the memory location designated by said input-pointing means by adding one to the value designated by said input-pointing means, and updates the end address of the vacant region which is stored in the memory location immediately preceding the memory location designated by said input-pointing means to the end address of the latest vacant region of said buffer memory means from which data has been newly read out, when the start address of the latest vacant region is found to be identical to the end address of the vacant region which is stored in the memory location immediately preceding the memory location designated by said input-pointing means.

10. The processing system as claimed in claim 1, wherein said processing means compares the oldest address stored in said address memory means with the start address of the latest vacant region of said buffer memory means from which data has been newly read out, updates the oldest address to the address, of said buffer memory which has not been read out yet, next to the end address of the latest vacant region of said buffer memory means from which data has been newly read out when the oldest address is formed to be identical to the start address of the latest vacant region, compares the memory location designated by said output-pointing means with the memory location designated by said input-pointing means to determine whether said control table means is empty or not, compares the updated oldest address with the start address stored at the memory location designated by said output-pointing means, when the memory location designated by said output-pointing means is found to be not identical to the memory location designated by said input-pointing means, re-updates the updated oldest address to the address, of said buffer memory which has not been read out yet, next to the end address stored in the memory location designated by said output-pointing means, when the updated oldest address is found to be identical to the start address stored at the memory location designated by said output-pointing means, updates the memory location designated by said output-pointing means by adding one to the value designated by said output-pointing means, completes the updating of the oldest address for the latest vacant region from which data has been newly read out, after the memory location designated dy said output-pointing means has been updated, or when the memory location designated by said output-pointing means is found to be identical to the memory location designated by said input-pointing means, or when the updated oldest address is found to be not identical to the start address stored at the memory location designated by said output-pointing means, compares the memory location designated by said output-pointing means with the memory location designated by said input-pointing means to determine whether said control table means is empty or not, when the oldest address is found to be not identical to the start address of the latest vacant region, compares the start address of the latest vacant region of said buffer memory means from which data has been newly read out with an end address of the latest vacant region which is stored in a memory location immediately preceding the memory location designated by said input-pointing means, when the memory location designated by said output-pointing means is found to be not identical to the memory location designated by said input-pointing means, registers the start and end addresses of said vacant region at the memory location designated by said input-pointing means, when the memory location designated by said output-pointing means is found to be identical to the memory location designated by said input-pointing means, or when the start address of the latest vacant region is found to be not identical to the end address of the vacant region which is stored in the memory immediately preceding the memory location designated by said input-pointing means, updates the memory location designated by said input-pointing means by adding one to the value designated by said input-pointing means, and updates the end address of the vacant region which is stored in the memory location immediately preceding the memory location designated by said input-pointing means to the end address of the latest vacant region of said buffer memory means from which data has been newly read out, when the start address of said latest vacant region is found to be identical to the end address of the vacant region which is stored in the memory location immediately preceding the memory location designated by said input-pointing means.

* * * * *